April 24, 1945.  W. A. MELSOM  2,374,226
FLEXIBLE HOSE COUPLING
Filed May 8, 1942
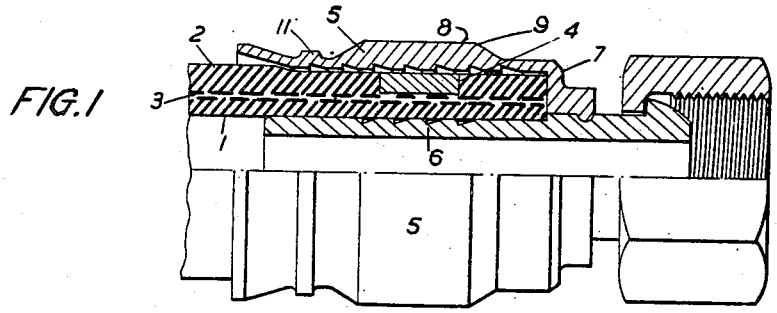
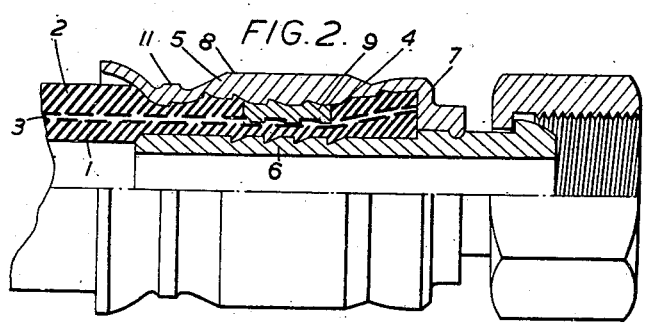
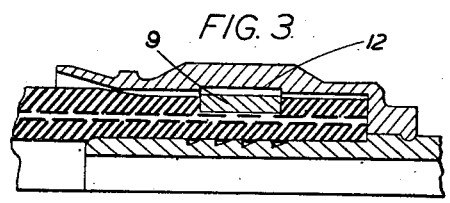 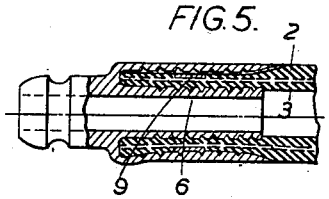
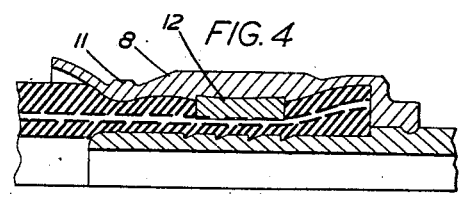 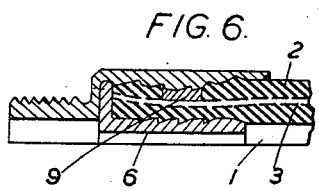
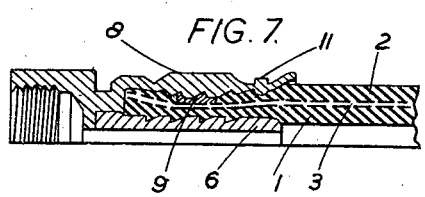
INVENTOR
Walter Arthur Melsom
BY
Albert F. Nathan
ATTORNEY Patented Apr. 24, 1945

2,374,226

UNITED STATES PATENT OFFICE 2,374,226

FLEXIBLE HOSE COUPLING

Walter Arthur Melsom, London, England, assignor to Bowden (Engineers) Limited, London, England, a British company Application May 8, 1942, Serial No. 442,208
In Great Britain February 4, 1942

9 Claims. (Cl. 285—84)

The present invention relates to improvements in flexible hose coupling components comprising a flexible hose having tubular layers of resilient material such as rubber in various forms, natural or synthetic, reinforced by one or more tubular layers of flexible reinforcing material between such layers of resilient material, an inner rigid tubular insert and a circumferentially continuous sleeve which is made of material suited to contraction such as brass, aluminum alloy, low carbon steel, or phosphor bronze, and is contracted to clamp the hose on to the insert (which may be of the same material as the sleeve) and which are suitable and more particularly intended, for use with medium and high pressure hoses, (i. e., hose suitable for pressures of from 500 lbs. per sq. inch upwards) such as are employed for the hydraulic or pneumatic transmission of power or for the conveyance of gases, liquids, semi-solids or viscous substances under pressure, where it is of great importance that the couplings shall neither blow off nor the anchoring stresses prove too severe for the hose material.

The rubber or rubber-like material of the hose is substantially incompressible, and it is a problem in manufacturing these coupling components that contraction of the sleeve tends to force the rubber axially out of the sleeve, or into any cavity that is available, and that as a result although the grip of the sleeve on the outer tube or layer of the hose may be considerable, that of the inner tube or layer on the insert, and in many cases, that of the outer tube on the reinforcement are insufficient to withstand the internal fluid pressures within the hose and relative axial displacement of the hose and the coupling or of layers of the hose inter se may occur.

The problem has become more urgent owing to the necessity, due to war exigencies of using hose of wider variations in quality which hose might not possess to the same degree the normal characteristics of high grade natural rubber or neoprene and this invention relates to improved forms and methods of construction of coupling components suitable for constraining these more easily flowing materials and enabling a sufficiently powerful contracting pressure to be exerted on the sleeve so as to prevent the reinforcing braiding of the hose being axially displaced relatively to its surrounding rubber or rubber-like covering or the displacement of the hose as a whole in relation to the coupling. The application of the present invention is not however restricted to its use with these special materials.

I have therefore aimed at producing a coupling component which will bear contracting pressures as high as or even higher than those usually used with the tougher rubbers without rupturing the material of the hose or weakening it to the extent that it will be penetrated by the fluid within the hose when the hose is in use, and which moreover can be successfully manufactured over a wide range of rubber and rubber-like materials which includes the more easy-flowing materials above referred to.

According to the present invention a medially situated groove is formed in the outer layer or layers of rubber reaching to or nearly to a layer of reinforcing material and in this groove there is placed a separate contractible ring of suitable material (as hereinafter defined) around which the sleeve is contracted to contract such ring, the effect of such contraction of the sleeve and ring being to engage the ring firmly with the reinforcing layer to prevent any longitudinal displacement of such layer, to create a fluid tight seal under the ring, to displace a portion of the hose material lying under such ring into the enclosed region (as hereinafter defined) to bring the hose material in such region under pressure and to prevent its escape from such region, thereby causing such material to press the inner surface of the hose firmly upon the insert.

As the ring contracts it displaces a portion of the hose material into the region bounded by the sleeve, the insert and a diametral plane through the edge of the ring nearer to the closed end of the sleeve, hereinafter termed "the enclosed region," and this displacement builds up pressure on the hose material confined in such region thereby pressing the inner surface of the hose firmly upon the insert. The ring as it contracts may also expand sideways so diminishing the length of the enclosed region and any contraction of the sleeve enclosing such region diminishes the external diameter of such region or of a part thereof and if one or both of these effects occur the required pressure in the enclosed region may be reached with a lesser displacement of material into it. As the pressure rises in this region it opposes the flow of further material into it, so permitting the higher pressure to be exerted by the contraction of the ring on the material lying below it without destroying the continuity of the hose at this point, so that an effective fluid-tight seal between hose and insert can be established there, whilst the direct engagement of the ring with the reinforcement holds the hose as a whole against longitudinal displacement.

It will be understood that the hose material in the enclosed region lying without the reinforcement is trapped against escape by the presence of the contractible ring, and that within the reinforcement by the intense pressure at the sealing zone under such ring.

I prefer to cut the groove right down to the surface of the reinforcing layer, but the result aimed at might be substantially attained if a thin layer of rubber or like material were left, since when the ring is contracted this layer or the greater part thereof would be forced into the interstices of the reinforcement or squeezed out from under the ring, but I believe that a better grip of the reinforcing material is secured by forcing the material of the ring rather than the rubber into these interstices. The complete removal of the rubber also simplifies the formation of the groove. Furthermore the removal of the whole of the rubber is necessary if electrical continuity is to be established as hereinafter mentioned.

Various proposals have been made to remove an end portion of the outer rubber tube of the hose to expose the reinforcement from the end of the hose throughout the whole or major part of the length of the portion of the hose to be inserted in the sleeve, and to interpose a metallic ring between the inner surface of the sleeve and such reinforcement, but these prior proposals have not provided a tube of rubber or like substantially incompressible material between the separate ring and the end of the hose such as is an essential feature of this invention.

According to another feature of the invention the axial flow towards the open end of the sleeve of the material on that side of the ring may also be prevented or very considerably curtailed by contracting the sleeve to produce a secondary zone of constriction between the sleeve and the insert at or nearer to the end of the insert which projects into the hose in addition to the primary zone of constriction in the neighbourhood of the ring. It is generally desirable that the sleeve should not be so strongly contracted in forming this constriction as in the region around the contractible ring. This secondary zone may act as a supplemental sealing zone.

Although, as above stated, it is a feature of my invention that the hose material trapped between the ring and the closed end of the sleeve should be under pressure this pressure should not be allowed to rise to an abnormal degree or it may cause the insert to collapse, and whilst a slight contraction of the insert has not been found to be prejudicial, any danger of real collapse must be avoided. For this purpose the portion of the sleeve between its closed end and the ring should be so shaped and dimensioned and the contraction be so regulated as to avoid such excessive pressure, these factors being adjusted in accordance with the amount of rubber to be displaced, bearing in mind that a portion of the displaced rubber will be forced into the interstices of the reinforcement. As the trapped rubber should exert pressure between sleeve and insert as above described cavities beyond the end of the hose, or cavities opening to the exterior should be avoided.

For the same reason the sleeve between the two zones of constriction should be so shaped and dimensioned that there is sufficient space to receive the rubber displaced from either zone towards the other without the creation of excessive pressure.

The diameter of the insert should preferably be slightly larger than the bore of the hose, to avoid any tendency of the latter to crinkle.

The rubber or like material of the outer tube on each side of the ring exerts a powerful pressure on the reinforcement and the inner tube as well as upon the inner wall of the sleeve, as does the ring upon the reinforcing material and the rubber of the inner tube which lies under the ring. Displacement of the rubber of the inner tube which is encircled by the ring is therefore restricted and a sealing joint which will withstand the internal fluid pressures can be produced with the great certainty (and in the large scale production of the coupling components with great uniformity) despite considerable variations in the quality of the hose materials being used in such production.

I have found that rings of soft aluminium, annealed brass, copper or lead serve very well, the ring being generally of softer metal than the sleeve and we have also obtained successful results with rings of compressed fibre. A fabric, e. g., canvas ring, either embedded in rubber, or not, may be used and even a ring of rubber but such ring (hereinafter referred to as a ring of suitable material) must in all cases have a substantially greater resistance to flow than the hose material on either side of it.

In general the width and thickness of the ring are substantially equal to those of the groove, but the thickness may be varied in accordance with the shape of the sleeve, and the method and degree of contraction to be applied. Although the material of the ring has a greater resistance to flow than the hose material on either side of it, the width of the ring will in general increase somewhat as the ring is contracted, thus increasing the displacement of the hose material.

In another form of construction the ring is thicker than the depth of the groove and the outer portion of the ring is arranged to fit into an annular groove, preformed in the sleeve, in the course of effecting the contraction, thus keying the ring to the sleeve against axial displacement.

The ring is preferably formed by a strip of material wrapped around the groove, the strip may be roughly preformed to circular shape and then finally deformed into the groove. Alternatively the ring may be of a low melting point metal and may be cast or moulded into the groove. In some cases the material of the ring may be inserted into the groove in a plastic condition.

The groove may be provided by first removing an end length of the outer tubing, placing the contractible ring in position and either replacing the part removed (suitably shortened) or substituting another length of resilient material, but it is simpler to strip off the comparatively narrow ring of rubber or like of the width of the groove.

I have found that in some cases the ring tends to counteract axial movement of the reinforcing layer by assuming a conical form, pointing towards the closed end of the sleeve, and this action appears to be more pronounced with narrower rings.

The outer surface of the sleeve is preferably formed with two enlarged portions, in the regions of the primary and secondary zones, but sleeves of uniform thickness may be used.

I prefer to contract at the secondary zone before the contraction at the primary zone commences, but the two contractions may be carried out simultaneously or the contraction at the primary zone may be carried to such a point as to key the ring into position and then both zones may be contracted simultaneously. In some cases it is advisable to effect a further contraction at the secondary zone after the initial contraction and the contraction at the primary zone have been completed.

I prefer to contract by the steady pressure of a number of radially moving devices, e. g., a circular series of dies but other methods of contraction are available such as contracting by relative longitudinal movement between a sleeve and a die or by the dies of a rotary swaging machine but these methods usually complicate the manufacture or do not lend themselves so readily to control over the contracting pressures.

I would have it to be understood that where herein I speak of a contraction of the sleeve I mean such a contraction as will produce a permanent deformation.

In the form of flexible hose illustrated herein there are two layers or tubes of resilient material between which is a layer of reinforcing material but more than two layers of resilient material and more than one reinforcing layer may be used. In such case the groove may be cut through one tube only, or through the outer reinforcing layer and the next tube, but at least one layer of resilient material and reinforcing material is always left.

The reinforcements generally found in medium and high pressure hose are of braided structure, and may be either of metal or textile material. I have found that a reinforcement consisting of a layer of braided metal, e. g., groups of high tensile steel wires braided in tubular form enclosed between two fabric layers (which may be either braided or woven) gives very good results when used for the purposes of my invention.

The accompanying drawing illustrates by way of example forms of coupling components according to this invention.

Fig. 1 is a longitudinal elevation half in section before the contracting pressures are applied but with the components assembled ready for receiving such pressures and Fig. 2 is a similar view after the contracting pressures have been applied. Fig. 3 is a half longitudinal section before contraction and Fig. 4 is a similar view after contraction of a modified coupling component; Fig. 5 is a longitudinal sectional view of a further modification showing the top half before contraction and the bottom half after contraction. Figs. 6 and 7 are longitudinal sections after contraction, of two further modifications.

The hose comprises inner and outer layers or tubes 1 and 2, which may themselves be reinforced if desired, and reinforcement 3 between these tubes as hereinbefore described. A portion of the layer 2 down to the reinforcement is removed thus forming a circular groove 4 at a predetermined distance from the ends of the hose. This groove as shown is arranged approximately at the zone of greatest intensity of pressure produced by contracting the sleeve, i. e., when the hose is in position between the sleeve 5 and the insert 6 up to the end wall 7 of the sleeve, this groove is encircled by the externally enlarged band 8 of the sleeve.

Either before or after this groove has been made the outer end of the hose is ground truly circular so as to leave such clearance with the inner wall of the sleeve as will be completely filled when the sleeve has been radially contracted. Into this groove a band of material possessing a high degree of ductility and high resistance to shear is laid or wrapped to form a ring 9 which is preferably of less width than the band 8. This ring may be of soft aluminium or of any other of the ductile metals or nonmetallic materials before referred to and a wide range of such materials is available. The thickness of this band is approximately such that it equals the depth of the groove so that it restores a diameter substantially equal to that of the ground end of the hose. The width of the ring need not be great, for example, in small hoses of ⅛" bore, a width of ⅛" to 3/32" suffices, whilst a width of ¼" to 1/16" is adequate for hoses of ⅝" bore. The bands are preferably cut of a length substantially completely to fill the space of the annular groove by the time the contraction has been completed.

The band may be pre-formed to a circular shape of sufficient size to pass over the end of the hose before being closed down into the groove or if sufficiently ductile, it may be wrapped round manually, without pre-forming, into the groove.

These methods of inserting the ring into the groove are preferred to the other methods hereinbefore referred to, such as casting or inserting the material in a plastic state, as these other methods are liable to produce unnecessary practical complications.

The ring thus forms a partition between the two parts of the divided outer tube or layer of the ground end of the hose, and this partition is located where the zone of intense pressure is to be set up.

Beyond the ring and up to the closed end of the cavity between the sleeve and the insert, the inner and outer walls of the hose are complete.

Under the influence of the pressure imposed by the contracting devices, the primary band 8 is closed down so as to compel the ring to grip intensely the exposed braiding reinforcement of the hose. As the sleeve contracts continuously, the end portion of the outer tube is axially trapped inside the coupling and this material being substantially incompressible, axial flow of rubber is prevented and thus a very high and intense degree of pressure can be imposed upon the sleeve, causing a powerful grip to be exercised on the braiding reinforcement, thus preventing its displacement relative to its surrounding rubber wall or walls. The sleeve may be made with internal teeth which bite into the ring.

The sleeve is provided with another local enlargement 11 situate near to the end of the insert and by the same or other contracting devices I contract this enlargement to a lesser degree than the maximum at the ring zone 8. This secondary zone of contraction is preferably produced before the contraction of the primary band or before completion of the latter contraction or alternatively, the secondary band may be of smaller external diameter and radially moving devices used which first close in the primary band to some extent and then close the primary and secondary bands simultaneously. It is sometimes desirable to exert a further subsequent contraction at the secondary zone.

Thus the upward flow of the outer tube or layer of rubber is substantially blocked within the sleeve and to a somewhat lesser extent, the inner layer or tube of rubber is similarly affected. This method of fixation makes it possible to apply higher pressures than can be applied when a separate ring is not used and the ring can be chosen to have the required resistance to shear which should be substantially greater than that of the less tough rubber or rubber-like materials, so that greater resistance to relative endwise displacement of the different parts of the component is achieved.

In the alternative form of the invention illustrated in Figs. 3 and 4, the sleeve is provided with an internal annular groove 12, situate so as to surround the ring 9 so that as a result of the contraction of the sleeve, the outer portion of the ring 9, which protrudes somewhat beyond the outer diameter of the adjacent portion of the hose before contraction, becomes seated in the annular groove and thus axially interlocks with the sleeve. Inasmuch as in this contraction it is no longer necessary for the sleeve to be serrated or internally toothed to bite into the ductile ring, the latter may be made of harder material, and if desired of harder material than that of the sleeve.

Fig. 5 shows a variant form in which the insert and the sleeve are made in one piece and in which the sleeve has no local enlargements, the sleeve being initially of uniform wall thickness. This figure does not show a secondary zone of contraction, although with this construction as with the forms previously described, a secondary contraction may be used if desired. The shouldered down end of the integral sleeve and insert is shown in this view as adapted to receive a nut coupling in accordance with my prior Patents Nos. 540,489 and 540,490.

Obviously, the sleeve and the insert may be in one piece in forms of the invention such as those shown in Figs. 1–4.

Figs. 6 and 7 indicate two modifications in which the sleeve and insert are separate components, but the sleeve is made the junction member; in Fig. 6 the projecting end of the sleeve being externally screw-threaded and in Fig. 7 being internally screw-threaded.

The use of a metallic ring is preferred in cases where the hose has to be used in aircraft for the additional reason that it is necessary for such hoses to be bonded to provide a continuous electrical path from the sleeve at one end of the hose to the sleeve at the other, such path being of especially low electrical resistance generally not exceeding .06 ohm. The use of a metallic bond enables a continuous contact to exist through the metallic braiding from the sleeve at one end to the sleeve at the other end of the hose.

To obtain this result it is necessary to achieve a clean metal to metal contact between the surfaces of the metallic reinforcing braiding and the metallic ring.

What I claim is:

1. A hose coupling component suitable for use with medium and high pressure hose comprising a circumferentially continuous metallic sleeve and a rigid insert, between which is a chamber with inner and outer walls and one end wall, and a flexible hose having at least two tubular layers of rubber or other resilient material and at least one flexible metallic layer embedded between said resilient layers, a portion of the hose being arranged in such chamber and having a medial groove formed around a reinforcing layer in at least one resilient layer surrounding said reinforcing layer, said groove containing a separate metallic ring around which the sleeve is contracted to contract such ring, said ring engaging firmly with the reinforcing layer to prevent any longitudinal displacement of such layer and the inner surface of the hose creating a fluid-tight seal under the ring, and the hose material bounded by said inner and outer walls, said end wall and the diametral plane through the edge of the ring nearer to said end wall being trapped under pressure thereby causing such material to press the inner surface of the hose firmly upon the insert.

2. A hose coupling component suitable for use with medium and high pressure hose comprising a circumferentially continuous metallic sleeve and a rigid insert between which is a chamber with inner and outer walls and one end wall, and a flexible hose having at least two tubular layers of rubber or other resilient material and at least one flexible layer of reinforcing material embedded between said layers of resilient material, a portion of the hose being arranged in such chamber, said portion having a medially situated groove formed around a reinforcing layer in at least one resilient layer which surrounds said reinforcing layer, and in said groove a separate ring of material which withstands greater pressures than the resilient material of which said grooved resilient layer is formed around which the sleeve is contracted to contract such ring, said ring engaging firmly with the reinforcing layer to prevent any longitudinal displacement of such layer, and the inner surface of the hose creating a fluid-tight seal under the ring, and the hose material bounded by said inner and outer walls, said end wall and the diametral plane through the edge of the ring nearer to the said end wall being trapped under pressure thereby causing such material to press the inner surface of the hose firmly upon the insert.

3. A hose coupling component according to claim 2, in which said sleeve is also contracted to produce a zone of constriction between the sleeve and the insert which is situated between said groove and the end of the insert which projects into the hose.

4. A hose coupling component according to claim 2, in which the sleeve has a medial thickened band and in which said separate ring is of less width than said band said ring being contracted by the contraction of said thickened band around it.

5. A hose coupling component according to claim 2, in which the inner wall of the sleeve is provided with a medial circumferential groove, said separate ring being contracted by the contraction of the grooved portion of the sleeve around it so that it seats in said circumferential groove and thereby is interlocked with the sleeve.

6. A hose coupling component according to claim 2, in which said sleeve is also contracted to produce a zone of constriction between the sleeve and the insert which is situated between said groove and the end of the insert which projects into the hose and is formed with two thickened bands one being located opposite and contracted around the said ring and the other band being located where the said constriction is produced.

7. A hose coupling component according to claim 2, in which said ring is a strip of material bent to the shape of the groove, said strip being positioned in the place of a ring of material removed medially from the portion of the hose within the sleeve.

8. A hose coupling component according to claim 2, in which the contractible ring is a continuous ring of material and the portion of said resilient layer or layers which is situated between said ring and the said end wall is a separate ring of resilient material added after the ring has been positioned on the hose.

9. A hose coupling component according to claim 2, in which the ring is moulded in the groove in the hose before contraction of the sleeve.

WALTER ARTHUR MELSOM.